Feb. 24, 1942.                E. H. GODFREY                2,274,197
                 SLEEVE VALVE INTERNAL COMBUSTION ENGINE
                      Filed July 18, 1934        2 Sheets-Sheet 1
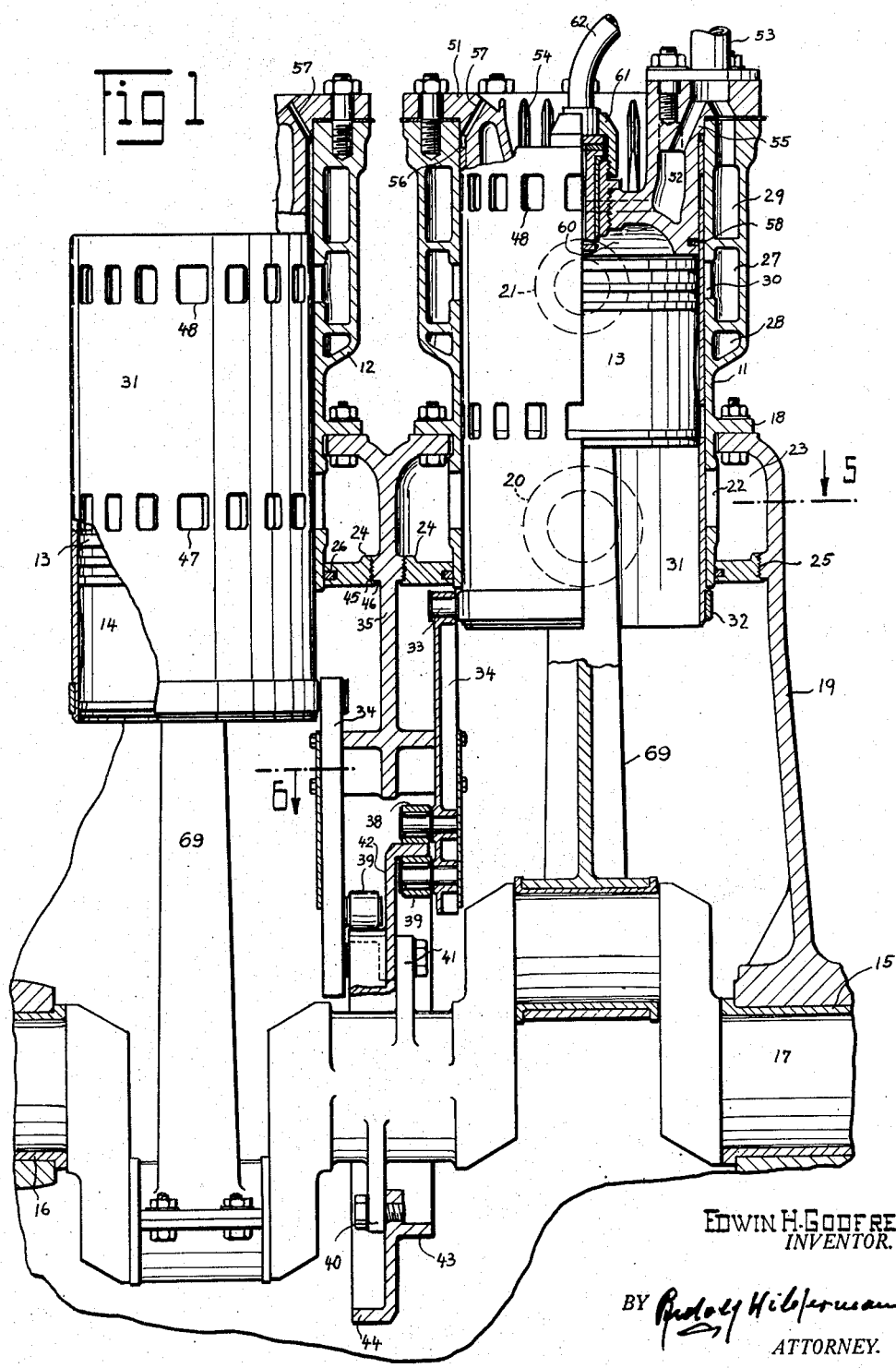
Edwin H. Godfrey
INVENTOR.
BY
ATTORNEY.

Feb. 24, 1942.   E. H. GODFREY   2,274,197
SLEEVE VALVE INTERNAL COMBUSTION ENGINE
Filed July 18, 1934   2 Sheets-Sheet 2
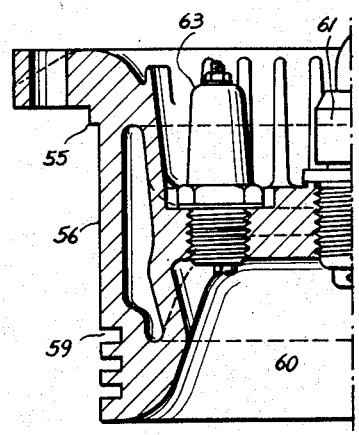
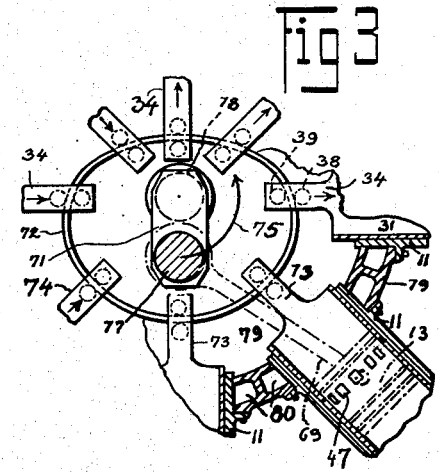
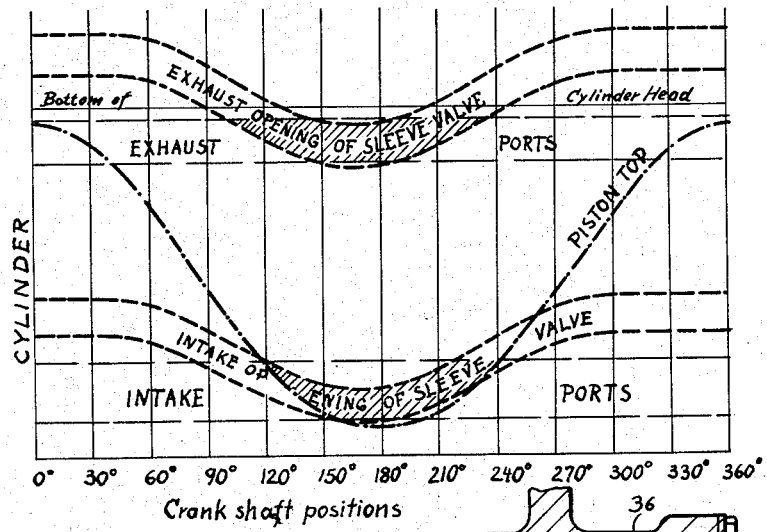
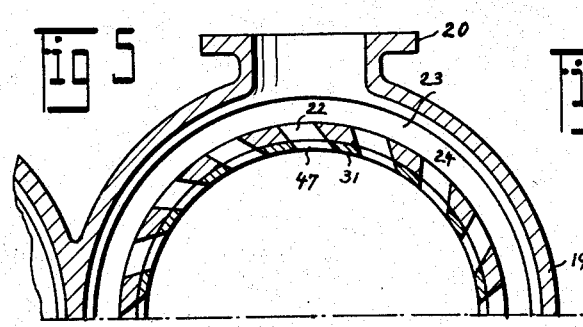
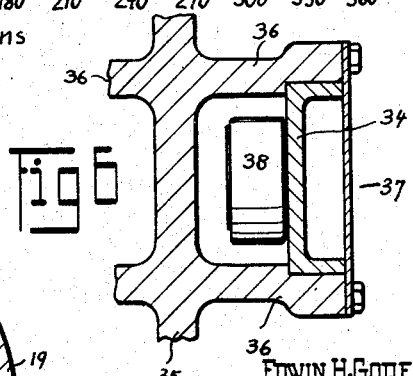
Edwin H. Godfrey
INVENTOR.
BY
ATTORNEY.

UNITED STATES PATENT OFFICE 2,274,197

SLEEVE VALVE INTERNAL COMBUSTION ENGINE

Edwin H. Godfrey, Wenonah, N. J., assignor to Godfrey Manufacturing Corporation, New Brunswick, N. J., a corporation of New Jersey Application July 18, 1934, Serial No. 735,806

9 Claims. (Cl. 123—55)

This invention concerns a sleeve valve internal combustion engine; the general object is the practical adaptation of sleeve valve control, particularly by a straight, single sleeve, for two-stroke cycle engines, be they operated by gasoline or by heavy fuel; but some of the objects of this invention involve improvements, which apply to four-stroke or Otto cycle engines as well.

One object of this invention is directed to the construction of a compact prime mover capable of high power at a comparatively low ratio of weight to output.

In order to obtain a smoothly functioning, simple, rugged and yet flexible mechanical arrangement, sliding valve means have been used before; they reciprocate in synchronism with the piston, but lag or are advanced relatively to the movement of the piston, so that by themselves or in cooperation with the moving piston, they open or close the intake and exhaust ports. Thus oppositely moving pistons have been arranged in the past in a cylinder, head to head, and were operatively connected by gearing, so that they opened and closed the ports in due order. But such an arrangement required a plurality of crank shafts or crank throws and connecting rods; in spite of most careful workmanship a play in the transmission gearing could scarcely be avoided; and, of course, such engines required comparatively large space and were correspondingly heavy.

The substitution of a valve for the second piston suggests itself, but sleeve valves offer inherent difficulties; they require, for instance, particular attention to the lubricating system; aside from that problem, trouble arises due to the development of excessive heat at the ports and also on account of the movement of the sleeve valve, at times at least, in a direction opposite to the piston. It is a further cause of trouble that, as it is ordinarily the case, such movement takes place while the valve is exposed to the strains of a compressed or exploding charge.

It has been an object of this invention to overcome the difficulties connected with the operation of sleeve valve motors, as they just were outlined; more particularly I have developed a light weight sleeve valve, which—on account of its small mass—may be predeterminedly reciprocated at a high speed.

In fact, I contemplate making the valve sleeve so thin that it may momentarily yield when exposed to the great pressures occurring in the combustion chamber. But I also make provisions to prevent any evil effects which might result from such dilation of the sleeve.

The valve is stationary when exposed to highest pressures. The deformation is controlled, because the sleeve is outwardly fully supported by the cylinder wall upon which it slidably abuts; and the deformation is only momentary, because the material of the sleeve is of such resiliency that the sleeve resumes its normal shape as soon as the pressure decreases. Such action is enhanced by uniformly shaping the affected part of the sleeve and by arranging it intermediate to—but not at—the ends of the sleeve.

In my improvements I consider in particular a quick and ready introduction of the charge and removal of the combustion product.

Another object of this invention concerns operation at comparatively high speeds and is also directed to overcome a sluggish response in the controls and an uneven performance encountered where an engine must operate under varying conditions, in aviation for instance, in various positions of incline or at various altitudes.

Further objects incident to the development of this kind of an engine will be better understood from the following description and in the light of the exemplary execution set forth in detail in the accompanying drawings, where Fig. 1 shows the cross-section of part of a multi-cylinder engine, which is exemplarily arranged for operation by heavy fuel, as a Diesel engine.

Fig. 2 illustrates a cross-sectioned half of a modified cylinder head for operation by gasoline or other volatile liquid fuel, which may be substituted for the cylinder heads of Fig. 1.

Fig. 3 indicates in a schematic view the cam arrangement for an adaption of this invention to radial type internal combustion engines.

Fig. 4 shows, in a diagram, the operating cycle, indicating the movements of the piston as well as of the valve openings in relation to the cylinder ports during one revolution of the crank shaft.

Fig. 5 shows a cross-section of the bisected cylinder and the sleeve valve, taken at the level of the intake ports when the perforations of the valve are aligned with the corresponding ports in the cylinder in a direction indicated in Fig. 1 by an arrow and by the numeral 5.

Fig. 6 shows a detail cross-section of the housing, taken in a direction and at a level pointed out by the numeral 6 in Fig. 1; it illustrates a preferred arrangement according to which the sleeve valve controlling connected rod may be slidably accommodated in the housing.

Similar numerals refer to similar parts throughout the various views.

Whereas this invention may be applied to most types of internal combustion engines known today, be the cylinders arranged in a block, radial, or V-formation, be they revolving or stationary, I have selected for the purposes of this exemplary description a multi-cylinder engine in which the cylinders are aligned in straight formation. The cylinder 11 of Fig. 1 represents the last cylinder of the motor, and the cylinder 12, next to it, is shown in part only. For purposes of perspicuity the pistons 13 and 14 (connecting rods 69) in these two cylinders are respectively shown in the top center and bottom center position.

Only part of the crank case is shown, but we see the crank shaft 17, to which the pistons connect in the usual manner, to be exemplarily journaled between pairs of cylinders, the last bearing 15 and an intermediate bearing 16 being indicated in Fig. 1.

This invention is not directed to specific improvements in mechanical suspension and balancing, lubrication, cooling, or carburetors and ignition in the case of the gasoline type engine, or fuel injection, and atomization in connection with a heavy fuel operated engine, it being understood that all suitable improvements offered by the art in respect to these details may be applied within the discretion of the skilled designer or automotive engineer. Light fuel, like gasoline may be introduced by way of a carburetor; but I prefer to inject it in a solid jet in the manner known for heavy fuel.

In the design chosen for the purpose of this invention separate cylinders like 11 and 12, are attached by flanges 18 upon the level surface of the crank case. Part of said cylinders extends into the crank case, and the air charge is there adduced to the cylinders, by way of manifolds 29, e. g. from an air compressor, not shown.

A similar, exhaust manifold 21 may be provided near the upper end of the cylinder. Since it is of great importance to introduce the charge and to expel the exhaust as quickly as possible, the respective manifolds may be extended around the cylinders, the charge and discharge entering upon and leaving the cylinder on all sides. For that purpose the circumference of cylinder wall is perforated at the intake and exhaust levels, so much of the cylinder wall being left between the perforations as necessary in order to preserve structural stability, and to prevent undue strains and warping and to maintain a smooth continuity upon the inside of the cylinder for a sliding support of the parts reciprocating therein.

The annular chamber 23, by way of which the charge is introduced from the manifold 20 into the intake ports 22, is formed in the top part of the crank case and is suitably closed at the bottom. As one mode of construction I indicate annular flanges rings 24, which are engaged by means of threads 25 upon the inside of the crank case and are tightened up so that rims 45 abut upon shoulders 46. The flanges 24 seal upon the outer circumference of the lower end of the cylinders by means of piston or packing rings 26. Of course this means for closing the bottom of chamber 23 is arbitrarily suggested.

It will be noticed (Fig. 5) that the intake ports 22 are angularly disposed, tangentially so to speak, (the perforations 47 of the sleeve valve 31, which register therewith, are arranged at a similar angle) so that the charge of air sets up a vortex in entering upon the combustion chamber. Therefore the charge whirls in the combustion chamber for the purpose of turbulence, i. e. improved mixing and combustion, cooling of the piston top, exhaust gases and cylinder walls and of improved expulsion of the exhaust gases thereabove, e. g. by stratification of the old and new charges.

The exhaust ports 30 perforate the cylinder wall above the crank case in an analogous manner, and an annular chamber 27 is formed around the cylinder wall, upon which issue one or more branches 21 of the exhaust manifolds. These chambers 27 may, for instance, be cast into the cylinder wall in the manner in which the art provides cooling chambers 28 and 29 therein.

While the intake ports of the cylinder are preferably slanted, that is not necessarily the case in respect to the ports 30 and the corresponding perforations 48 in sleeve 31, through which the exhaust is expelled.

In the cylinders 11, 12, etc., the sleeve valves 31 are vertically slidably disposed, with the customary play for lubricating purposes. These sleeve valves are outwardly guided along their whole length in the cylinder, they are of tubular structure, and they do not move when the charge in the combustion chamber within is under greatest pressure and heat as will be explained below; hence they may be very thin, their material being selected primarily under consideration of slidability and hardness, heat resistance and a low expansion coefficient or a coefficient coordinated to the coefficients of expansion of the cylinder material. I emphasize the light weight of the sleeve valves, because it facilitates rapid reciprocation and ease of control of their movement due to reduced inertia.

At a suitable point of attack near the lower end of the sleeve valves a mechanism is connected therewith, for vertically reciprocating said valves, preferably along a straight path. Thus I show a collar 32 shrunk around the bottom end of the sleeve valve, and a stud 33 integrally extends therefrom, onto which is suitably hooked the free end of a connecting rod, for instance of the connecting slide 34.

The connecting slides 34 are cyclically reciprocated, preferably with a slight lag relatively to the piston movements; such operation may be brought about by any suitable gearing, for instance as follows:

Between pairs of adjoining cylinders a separating partition 35 extends partways down into the crank case, and spaced webs 36 extend therefrom in opposite directions, forming troughs, in which the connecting slides 34 are vertically slidably accommodated (Fig. 6). Suitable covers 37 retain the slides 34 in the troughs, and upon the backs of the slides vertically spaced rollers 38 and 39 are provided for.

Between adjoining pairs of cylinders an eccentric or a suitable cam is mounted upon the crank shaft and controls the vertical sliding movement of slides 34. In the drawings I show for that purpose flanged sections 40 and 41 upon which is fastened the central web 42 of the cam. From opposite sides of the said web extend the endless cam faces 43 and 44 which respectively control the movement of the sleeve valves for cylinder 11 and 12 by way of the rollers 38 and 39 and connecting slides 34. The cams 43 and 44 are substantially symmetrical, but displaced from each other at 180 degrees, since the strokes of the piston of these particular cylinders are directly opposed to each other. The thickness of the endless cam rims 43 and 44 is carefully adjusted, so that they always—or complementarily if so preferred—are engaged in rolling contact between rollers 38 and 39.

The cylinder heads 51 are bolted onto the tops of the cylinders, the customary type of gaskets being provided for the purpose of a seal at the abutting faces. A suitable cooling chamber 52 may be cast into the cylinder head; a cooling fluid may be fed thereinto and circulated and withdrawn by way of suitable connecting fittings such as 53, the said fitting being shown to be connected to the cooling chambers 28 and 29 of the cylinder as well.

The cooling may be enhanced by suitable cooling fins such as indicated at 54.

Instead of being merely a top for the combustion chamber of the cylinder, the cylinder head 51 may be downwardly extended into the cylinder 11, a suitable shoulder 55 serving to align the cylinder head in the cylinder. Below the shoulder 55, the part of the cylinder head extending into the cylinder is shown to be receded along its outer circumference 56, in order to provide a cylindrical clearance groove or pocket in which the the upper end of the sleeve valve 31 travels up and down, as actuated by cam 43, 44. In order to overcome a reaction due to compression or rarefaction of the atmosphere enclosed in said pocket above the sleeve valve between the cylinder and the downwardly extending part of the cylinder head, the pocket connects to the outside or to the exhaust manifold: e. g. one or more vents 57 may be provided for, which extend from the outside through the body of the cylinder head to the top of said groove or pocket.

Around the outer circumference of the downward extension of the cylinder head 51 are placed, in suitable grooves 59, one or more piston rings 58 by means of which a seal is provided for between the lower end of the cylinder head and the sleeve valve.

In the arrangement of Fig. 1 the piston moves up into proximity with the bottom end of the downward extension of the cylinder head, so that a high compression of the charge is obtained in the space 60, as required for Diesel type engines. In such instance the fuel may be introduced by means of an injector or spray nozzle 61 issuing upon said space 60 through the cylinder head and injecting fuel at or near a top dead center position of the piston, when the sleeve valve 31 is stationary. The air charge is however introduced through manifold 20.

For Diesel operation the injector 61 is suitably connected by means of a conduit 62 to an injector pump (not shown) as known to those acquainted with this art.

If the fuel, gasoline for instance, is introduced by way of an injector or spray nozzle 61, but is not to be ignited by compression, but by electric ignition, less compression is required in the combustion chamber. In that case a cylinder head of the type shown in Fig. 2 may be used, which differs from that of Fig. 1 primarily in respect to a larger combustion space 60; a spark plug is indicated at 63.

I have described a specific mode of execution of my invention in detail. Therefore my improvements may be readily applied by the automotive engineer to other types of internal combustion engines. The invention may advantageously be applied to radial engines, assuming, for instance, the appearance of the embodiment outlined in the schematic sketch of Fig. 3. Again the crank shaft 71 (axis 78, eccentric 77) and cam 72 are relatively stationary, but movable relatively to the housing 79. The connecting slides or arms 34 are radially arranged substantially in alignment with the cylinders 11 and exemplarily form, in this modification, extensions of sleeve valves 31 which, by way of rollers 38 and 39, directly engage upon the outer and inner faces of the cam 72.

The face cam 72 corresponds in shape substantially to the cam rims 43 and 44 of Fig. 1. An arrow indicates the direction of movement of the crank shaft and the cam; arrows are applied to the connecting arms 34 in order to indicate the radial direction in which the arms are moving, or are about to move. It will be noted that in the instance of the arms 73 (some of the arms 34) no such arrow is indicated because at that moment they are not moving nor are they about to move. The rollers of these arms 73 are engaged upon a section of the face cam 72, which is disposed substantially concentric to the axis of the crank shaft. A third arm 74 is still stationary, being engaged upon that circular section of the cam; but it is about to pass from the circular onto the spiral extent of the cam and will then move towards the axis 78, as indicated by the arrow, while the eccentric 77 revolves in the direction of arrow 75.

As shown in connection with the section of the housing 79 indicated in Fig. 3, the cylinders 11 are radially disposed upon the circumference of the housing 79 and are again shown to extend into the housing through the chambers 80 which take the place of chambers 23 of Figs. 1 and 5. One connecting rod 69 and piston 13 are exemplarily indicated in dot-dash lines in Fig. 3, and the other connecting rods may correspondingly be journalled upon eccentric 77 or may be hinged upon the hub of the one connecting rod shown, in agreement with the established practices of radial engine design.

While the aplication of my invention to radial engines, as indicated in Fig. 3, offers an opportunity to study the cam action step by step, I desire fully to elucidate the valve and cam action by the diagrammatic layout of Fig. 4. It indicates the positions of the top of the moving piston, and of the moving sleeve valve relatively to the cylinder and cylinder head. That diagram covers a two-stroke cycle, or one complete revolution of the crank shaft, beginning and ending with the top center position of the piston in the cylinder. For the purpose of this diagram, the lower end of the cylinder may be considered to be at the abscissa or therebelow. The bottom edge of the extension of the cylinder head into the cylinder is indicated by a thin horizontal line marked "Bottom of cylinder head." The level of the exhaust ports, which break through the wall of the cylinder, is indicated by a horizontal strip between two dashed lines, which is marked "Exhaust ports." A curved strip, which overlaps the strip marked "Exhaust ports," is confined between heavy dashed lines and is marked "Exhaust opening of sleeve valve," indicates the movements of the upper perforations of the sleeve valve. This strip indicates the vertical movement of the sleeve valve as actuated by the cam; of course, the lower perforations of the sleeve valve move correspondingly, as they are indicated by a curved strip between heavy dashed lines marked "Intake opening of sleeve valve."

The strip marked "Intake opening of sleeve valve" overlaps the level of the "Intake ports." While the "Exhaust ports" and the corresponding perforations of the sleeve valve marked "Exhaust opening of sleeve valve" substantially correspond in height, the "Intake ports" of the cylinder are shown to be higher than the lower perforations of the sleeve valve ("intake opening of sleeve valve"). Thus the "intake ports" and the "intake opening of sleeve valve" may overlap for a longer period of time than the "exhaust ports" overlap with the "exhaust opening of sleeve valve."

Whereas the exhaust is governed exclusively by the period of time and extent to which the "exhaust ports" and the "exhaust openings of the sleeve valve" overlap, that period and extent being indicated by shading, the intake is not only controlled by the overlapping of the "intake ports" and "intake opening of sleeve valve," but also by the piston; in that instance the shaded area does not represent an actual picture of the opening, it serves merely as an indication.

The movement of the piston is indicated by a dot-dashed line marked "Piston top" which shows the level of the top of the piston during the two-stroke cycle. The piston normally closes the perforations of the sleeve valve which are marked "Intake opening of sleeve valve" and uncovers them only after they have registered with the "intake ports," so that the opening of the intake of the engine is really not governed by the cylinder ports but by the sleeve valve and by the piston. In the closing of the engine intake we have, however, a cooperation of cylinder ports, sleeve ports and piston.

When, on the downward stroke, the "intake openings of the sleeve valve" have dropped into full communication with the air chamber by way of the "intake ports," the intake ports proper are still actually closed by the piston. But slowly the piston drops below the "intake opening of sleeve valve" so that air is admitted right onto the top of the piston in a gradually, steadily increasing blast, until the intake port proper is fully open at or before the bottom dead center position of the piston. Now, in order to allow the whirl produced by the tangentially inrushing air to take full effect by developing the greatest rotary momentum, I do not want to cut off the intake immediately by the piston arising on the return stroke, but I desire to preserve the full tangential intake blast, and preferably right on top of the piston so that the whirl is logically built up upwardly from the bottom of the combustion space above the piston, substantially up to the time the exhaust is closed at the top of said space.

Such a method of operation is most appropriately carried out by moving the fully open air intake port proper up, just ahead of the rising piston. This is effected in my apparatus, in accordance with the diagram of Fig. 4, by moving up the sleeve valve substantially co-extensively to the rising piston, the full blast through the intake proper being preserved, since the admitting, stationary "intake opening of sleeve valve" is upwardly elongated to a corresponding distance. Of course the dynamic, whirling effect of the intake cannot be further promoted, when the sweep through the combustion space is terminated by the closing of the exhaust port. Therefore I allow the pressure in the combustion space finally to be statically substantially balanced with the pressure of the compressed air supply and then I shut off the intake proper substantially at the 240° position; the swiftly rising piston now compresses the air until finally the fuel is centrally injected into the whirling air charge, and is thoroughly distributed therein due to the whirling turbulence.

Another observation may be made from the diagram of Fig. 4, i. e. that the piston and sleeve valve never move in opposite directions except for a fraction of the period of the cycle (in the diagram 170°–180°) and to a hardly perceptible extent. Thus undue pull and strain are avoided.

We also observe in the diagram of Fig. 4 that the upper perforations of the sleeve valve are exposed for only a limited period of time (about 90° to 240°) to the atmosphere in the combustion chamber, and that at a time when the pressure and heat in the chamber are low. During the remaining part of the cycle the said perforated part of the sleeve valve is in the pocket between the cylinder and the downward extension of the cylinder head.

But, what is most important, the sleeve valve is substantially stationary, and said upper perforations of the sleeve valve are accommodated in the said pocket, when the combustible charge is under highest compression, when said charge explodes and during the beginning of the expansion of the charge. This period of rest of the sleeve valve, during which the upper perforations are concealed, extends through a predetermined extent of highest compression near the top position of the piston.

The cams may readily be adjusted to bring about a standstill of the sleeve valve during highest compression, or during any predetermined extent of such compression. The standstill may for instance be timed to extend from the moment of explosion until the pressure has dropped again to the pressure which prevailed before explosion. Small inertia of the sleeve valves permits them to obey the control superimposed thereupon by the cam. In turn, perfect control of the movement of the valves and particularly their standstill at the crucial period of highest compression, e. g. while the piston moves down from a momentary stop in the top center position, allows the sleeve valves to be executed in such light weight, that their mass is easily controlled.

There may of course be a relative adjustment between the heights and positions of the ports and the sleeve valve perforations; in particular, there is no specific limit set to the bottom extent of the intake ports, as readily understood by those acquainted with the art.

Although I have shown and described only a few exemplary forms of embodiment of my invention in detail, yet I do not wish to be limited thereby, except as the state of the art and the appended claims may require, for it is obvious that various modifications and changes may be made in the method and form of embodiment of my invention, without departing from the spirit and scope thereof.

What I claim is:

1. In an internal combustion engine of the solid fuel injection type, a cylinder, a piston, a perforated sleeve valve slidably disposed between said piston and said cylinder, and an intake chamber for air only and an exhaust chamber spaced relatively to each other and extending around said cylinder, said cylinder being perforated around its circumference at the levels of said chambers similarly to and registerably with the perforations of said sleeve valve, and gearing and a mechanism actuating said sleeve valve and said piston and withdrawing said piston from a perforated part of said sleeve valve simultaneously with aligning the perforations of said sleeve valve in full communication with those in said cylinder.

2. In an internal combustion engine having a housing with a crankshaft controlling the piston, a straight track in said housing, a sleeve valve, a pair of pins parallel to the cylinder and stationary relatively to said sleeve valve, rollers on said pins, and a cam on said crank shaft, said rollers being operatively engaged on said cam and guided parallel to the axis of said sleeve valve by said track.

3. In an internal combustion engine having a housing with a crankshaft controlling the piston, a slide box in said housing, a sleeve valve, a pair of pins parallel to the cylinder and stationary relatively to said sleeve valve, rollers on said pins, and a cam with substantially coextensive inner and outer faces on said crankshaft, said rollers being operatively engaged on said faces of said cam, respectively and guided along a straight path by said box.

4. In a two-stroke cycle internal combustion engine of the solid fuel injection type, a cylinder and piston, a sleeve valve slidably disposed between said piston and said cylinder, two sets of ports in said sleeve, one of which is near the top, and the other one near the bottom of said sleeve, both of said sets extending around the entire circumference of said sleeve, two sets of ports in said cylinder extending around the entire circumference of said cylinder, and respectively in substantial alignment with said sets of ports in said sleeve, the upper ports in the cylinder being of the same height as those in the sleeve, while the lower or intake ports in the cylinder are higher than the corresponding ports in the sleeve, the lower cylinder ports fully overlapping the lower valve ports when the upper ports register, so that the air taken in through the lower ports in the cylinder and sleeve forces the exhaust gases out through the upper or exhaust ports of the sleeve and cylinder.

5. In a two-stroke cycle internal combustion engine of the solid fuel injection type, a cylinder and piston, a sleeve valve slidably disposed between said piston and said cylinder, and an intake and an exhaust chamber spaced relatively to each other and extending around said cylinder, said cylinder being perforated by lower and upper ports around its circumference at the levels of said chambers, and said valve being correspondingly perforated by way of lower and upper ports, so that said lower ports of the cylinder fully communicate with and also upwardly overlap the lower sleeve valve ports when the upper ports of the cylinder and sleeve valve are in registering alignment.

6. In a radial type, multi-cylinder, two-stroke cycle internal combustion engine, a crankcase having slide boxes, a crankshaft in said crankcase, a group of cylinders radially disposed about the crankshaft and having reentrant heads, pistons reciprocating in said cylinders, said pistons being operatively connected to said crankshaft, a sleeve valve slidably interposed between each of said cylinders and its respective piston and cylinder head, an extension on each valve slidable in one of said boxes, pairs of pins on said extensions, each pair of which is stationary with relation to its respective sleeve and located in a plane with the centerline of said cylinder and of the crankshaft, a roller on each of said pins, and a cam in said crankcase, all of said rollers being operatively engaged upon said cam, so that said sleeve valves are positively guided by said cam.

7. In a two-stroke cycle internal combustion engine of the solid fuel injection type, a cylinder, a reentrant cylinder head, a compressed air chamber communicating with said cylinder at its lower end, a piston, a sleeve valve slidably disposed between said piston and cylinder head and said cylinder and air chamber, a port in said sleeve opening to said chamber over a predetermined range of its movement, and a mechanism for independently reciprocating said sleeve and said piston, so that said port is fully open from said air chamber to the inside of said sleeve above said piston when said piston reaches its bottom dead center piston, said piston after leaving its bottom dead center position moving simultaneously with said sleeve while the ports in said sleeve remain in full communication with said air chamber, so that the port in said sleeve remains fully open.

8. In a two-stroke cycle internal combustion engine of the solid fuel injection type, a cylinder, a reentrant cylinder head, a compressed air chamber communicating with said cylinder at its lower end, a piston, a sleeve valve slidably disposed between said piston and cylinder head on one side and said cylinder and air chamber on the other side, a set of ports in said sleeve valve, extending on all sides around its circumference and opening to said chamber, and a mechanism for reciprocating said sleeve, so that said ports are fully open from said air chamber to the inside of said sleeve above said piston when said piston reaches its bottom dead center position, said sleeve and ports moving up simultaneously with said piston after said piston leaves its bottom dead center position while the ports in said sleeve remain fully open towards said air chamber, so that the air chamber and inside of said sleeve temporarily remain in full communication.

9. In a multi-cylinder sleeve valve internal combustion engine in which the sleeve valves are open at both ends, a housing having straight tracks, extensions on said sleeve valves slidable in said housing in said straight tracks, a crank shaft, and a single, double face cam mounted on said shaft, interposed between and directly engaged upon the extensions of sleeve valves in a pair of said cylinders.

EDWIN H. GODFREY.